United States Patent [19]

Sumida et al.

[11] 3,946,362

[45] Mar. 23, 1976

[54] TIME DIVISION MULTIPLE TRANSMISSION CONTROL APPARATUS

[75] Inventors: Shizuo Sumida; Kazuo Nii, both of Hiroshima; Hisatsugu Ito, Himeji; Atsushi Ueda, Himeji; Mitsuaki Ishii, Himeji, all of Japan

[73] Assignees: Mitsubishi Denki Kabushiki Kaisha, Tokyo; Toyo Kogyo Co., Ltd., both of Japan

[22] Filed: July 12, 1974

[21] Appl. No.: 487,980

[30] Foreign Application Priority Data
July 13, 1973 Japan.............................. 48-79116

[52] U.S. Cl. ................... 340/147 SY; 340/147 PC
[51] Int. Cl.² ........................................ H04Q 9/00
[58] Field of Search........ 340/147 SY, 147 PC, 167, 340/164 R, 171 R

[56] References Cited
UNITED STATES PATENTS 3,848,231  11/1974  Wooton ......................... 340/167 R
3,852,713  12/1974  Roberts et al.................. 340/164 R Primary Examiner—Donald J. Yusko
Attorney, Agent, or Firm—Oblon, Fisher, Spivak, McClelland & Maier

[57] ABSTRACT

A time division multiple transmission control apparatus which comprises a central processing device for generating a reference timing signal having a predetermined frequency and a time division multiple signal having substantially the same frequency for controlling a plurality of electrical devices during predetermined time periods, terminal processing devices for controlling each electrical device during a different predetermined time period under the control of said reference timing signal and said time division multiple signal and means for generating a phase difference between said reference timing signal and said time division multiple signal.

5 Claims, 7 Drawing Figures

PRIOR ART

TIME DIVISION MULTIPLE TRANSMISSION CONTROL APPARATUS

BACKGROUND OF THE INVENTION

1. Field of the Invention

The present invention relates to a time division multiple control apparatus. More particularly, it relates to an improvement in the transmission function of the multiple signals.

2. Description of the Prior Art

The electrical devices of vehicles, ships, airplanes, etc., have increased to such an extent that the wiring therefor has become quite complicated with the result that repairs have become quite difficult. In order to overcome these difficulties, it has been proposed to simplify the wiring operation by the use of a multiple control system utilizing a multiple communication system.

The multiple communication system includes a frequency division system and a time division system.

FIG. 1 is a block diagram of a typical time division multiple control system. The control apparatus of FIG. 1 is controlled by two types of signals; a reference timing signal for the reference timing of the control apparatus and a time multiple control signal for controlling the electrical devices.

In FIG. 1, the references $1a - 1n$ designate electrical devices; 2 designates a central processing device; 3 designates a reference timing signal generating circuit; 4 designates a control signal generating circuit for generating the time division control signal; $5a - 5n$ designate terminal processing devices corresponding to the electrical devices $1a - 1n$; $6a - 6n$ designate address detecting circuits; $7a - 7n$ designate synchronizing signal division circuits; $8a - 8n$ designate timing circuits; $9a - 9n$ designate signal separating circuits; $10a - 10n$ designate driving circuits; 11 designates a reference timing signal transmission line; and 12 designates a control signal transmission line.

FIG. 2 is a time chart for illustrating the operation of the apparatus of FIG. 1. In FIG. 2, $a$ shows the waveform of the output of the reference timing signal generating circuit 3; $b$ shows the wave-form of the output of the control signal generating circuit 4; $c$ shows the wave-form of the output of the synchronizing signal separating circuits $7a - 7n$; $d$, $e$ and $f$ show the wave-forms of the output of the timing circuits $8a$, $8b$, $8n$; $g$, $h$ and $i$ show the wave-forms of the signal division circuits $9a$, $9b$, $9n$; $j$, $k$ and $l$ designate the wave-forms of the outputs of the driving circuits $10a$, $10b$, $10n$.

The operation of the apparatus of FIG. 1 will be illustrated with reference to the time chart of FIG. 2. The central processing device 2 centrally generates signals for controlling the electrical devices $1a - 1n$. The reference timing signal generating circuit 3 generates a reference timing signal pulse P having constant frequency as shown in FIG. 2a. The signal pulse P is transmitted to the control signal generating circuit 4 and is simultaneously transmitted to the reference timing signal transmission line 11. The control signal generating circuit 4 is synchronized with the reference timing signal pulse P to generate the control signal. The control signals comprises control signal pulses $Qa - Qn$ corresponding to the electrical devices $1a - 1b$. The synchronizing signal S has a broader pulse width than that of the control signal pulses $Qa - Qn$. The control signal pulses $Qa - Qn$ are sequentially generated after the synchronizing signal S in the order of $Qa$, $Qb$ ... $Qn$. The control signal pulses $Qa - Qn$ drive the corresponding electrical devices $1a - 1n$. The control signal pulse is not generated when the corresponding electrical devices $1a - 1n$ are not driven. Thus, the control signal generating circuit 4 generates the control signals as shown in FIG. 2b and transmits them to the control signal transmission line 12.

The terminal processing devices $5a - 5n$ receive the control signals in order to control the electrical devices by the command of the central processing device 2. The terminal processing circuits are the same and, accordingly, only the terminal processing circuit $5a$ will be discussed in detail. The address detecting circuit $6a$ detects the address period for transmitting the control signal pulse $Qa$ corresponding to the electrical device $1a$. The address detecting circuit $6a$ comprises a synchronizing signal separating circuit $7a$ and a timing circuit $8a$. The synchronizing signal separating circuit $7a$ counts the reference timing signal pulses P when the synchronizing signal S or the control signal pulses $Qa - Qn$ are generated. When the synchronizing signal S having the broader pulse width is transmitted, the reset signal pulse T of FIG. 2c is generated and is applied to the timing circuit $8a$. The timing circuit $8a$ comprises a counting circuit. The timing circuit $8a$ is reset by the reset signal pulse T and counts the reference timing signal pulses P to detect the time for transmitting the control signal pulse $Qa$ corresponding to the electrical device $1a$ and to generate the address signal pulse $Ua$ of FIG. 2d.

The signal separating circuit $9a$ comprises a logical AND circuit and is connected to the timing circuit $8a$ and the control signal transmission line 12 whereby the control signal pulse $Qa$ is divided in the period generating the address signal pulse $Ua$ to generate the driving signal pulse $Va$ of FIG. 2g and to transmit it to the driving circuit $10a$. The driving signal pulse $Va$ is generated in the period transmitting the control signal pulse $Qa$, but is not generated in the period transmitting no control signal pulse $Qa$.

The driving circuit $10a$ drives the electrical device $1a$ from the time the driving signal pulse $Va$ is generated to the time the address signal pulse $Ua$ is generated. The control signal pulse $Qa$ is again transmitted when the next address signal pulse $Ua$ is generated. When the driving signal pulse $Va$ is generated, the electrical device $1a$ is driven. The driving of the electrical device $1a$ is stopped when the transmission of the control signal pulse $Qa$ is stopped at the time address signal pulse $Ua$ is being generated.

The other terminal processing devices $5b - 5n$ operate in a similar manner except that the address signal pulses $Ub - Un$ are generated from the timing circuits $8b - 8n$ during the period the control signal pulses $Qb - Qn$ are generated corresponding to the electrical devices $1b - 1n$.

The electrical devices $1a - 1n$ can be controlled depending upon the time division multiple control signal transmitted from the central processing device 2. However, the time chart of FIG. 2 illustrates an ideal state. In practice, each circuit element has a delay time. However, this time is usually short and accordingly no difficulties arise. However, the propagation delay time of the timing circuits $8a - 8n$ which are comprised of counting circuits causes difficulties if the counts are increased.

FIG. 3 wherein like references designate identical or corresponding parts is a time chart for illustrating this difficulty. As shown in FIG. 3c, the address signal pulse Ua generated from the timing circuit 10a has a rising delay time $t_1$ and a falling delay time $t_2$. Therefore, the period during which the address signal pulse Ua is generated overlaps the address period for the electrical device 1b. The signal pulse separated by the signal separating circuit 9a is generated as shown in FIG. 3d wherein the signal pulse Va is without error. However, the signal pulse Va' is erroneously generated because of the occurrence of control signal pulse Qb. Therefore, the electrical device 1a is not controlled by the control signal pulse Qa. This time error may also appear during signal transmission.

SUMMARY OF THE INVENTION

It is therefore an object of the present invention to provide a time division multiple transmission control apparatus in which the electrical devices are accurately controlled depending upon the control signal pulses and erroneous information can be prevented by preventing timing errors.

This is achieved in accordance with the present invention which provides a time division multiple transmission control apparatus which comprises a central processing device for generating a reference timing signal having a predetermined frequency and a time division multiple signal having substantially the same frequency for controlling a plurality of electrical devices during predetermined time periods, terminal processing devices for controlling each electrical device during a different predetermined time period under the control of said reference timing signal and said time division multiple signal and means for generating a phase difference between said reference timing signal and said time division multiple signal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
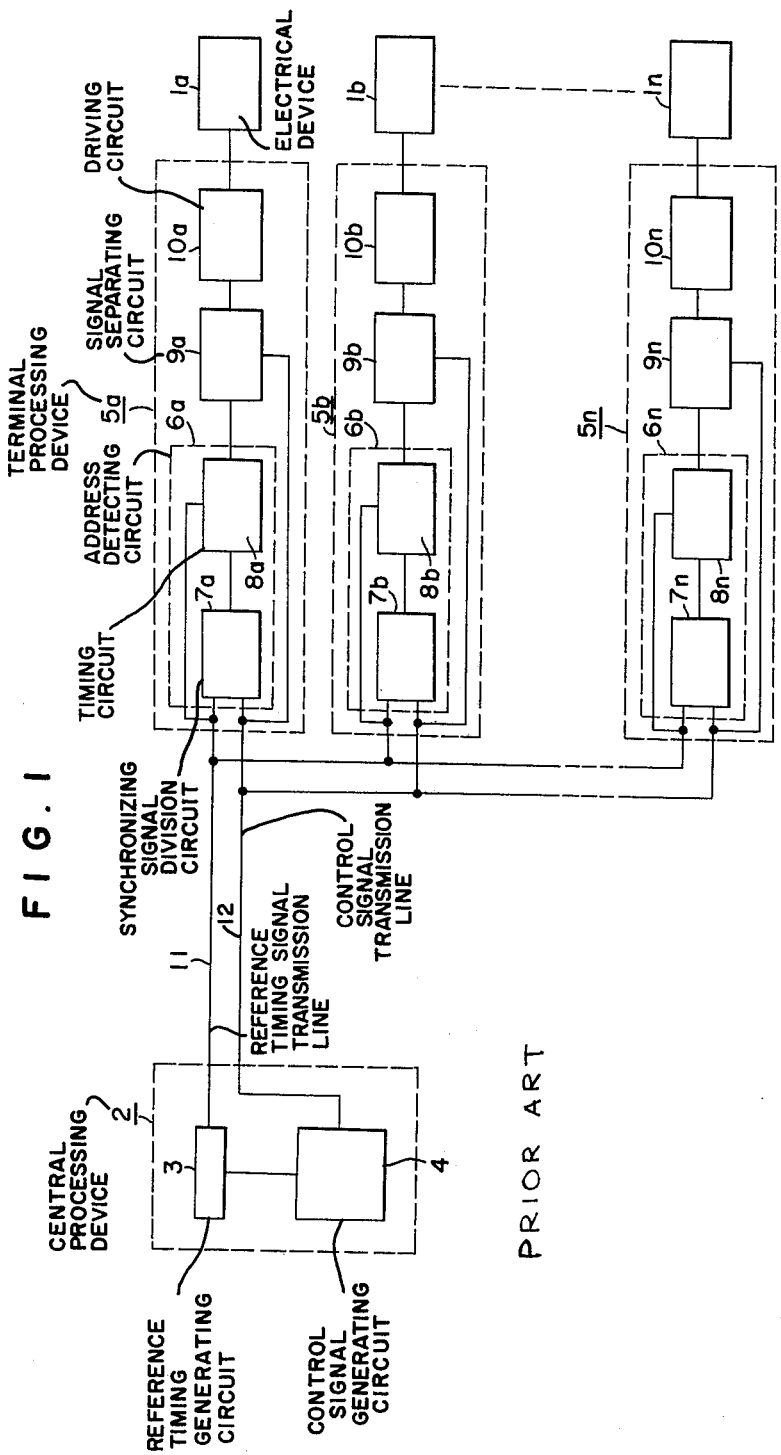
FIG. 1 is a block diagram showing one typical embodiment of the multiple control system.

Referring to the drawings, wherein like references designate identical or corresponding parts, one embodiment of the present invention is illustrated.

Figure 4:
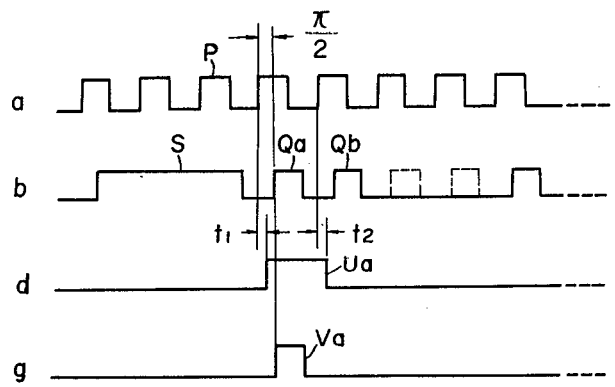
FIG. 4 is a time chart for the signals according to the invention.

FIG. 4 shows the signals according to the invention. A reference timing signal and a control signal with a phase difference of $\pi/2$ are transmitted whereby the timing circuit 8a counts the reference timing signal pulses P and only control signal pulse Qa corresponding to the electrical device 1a is transmitted in the period during which the address signal pulse Ua is generated. Because of this phase difference, erroneous information is not generated despite the occurrence of delay periods $t_1$, $t_2$.

Figure 2:
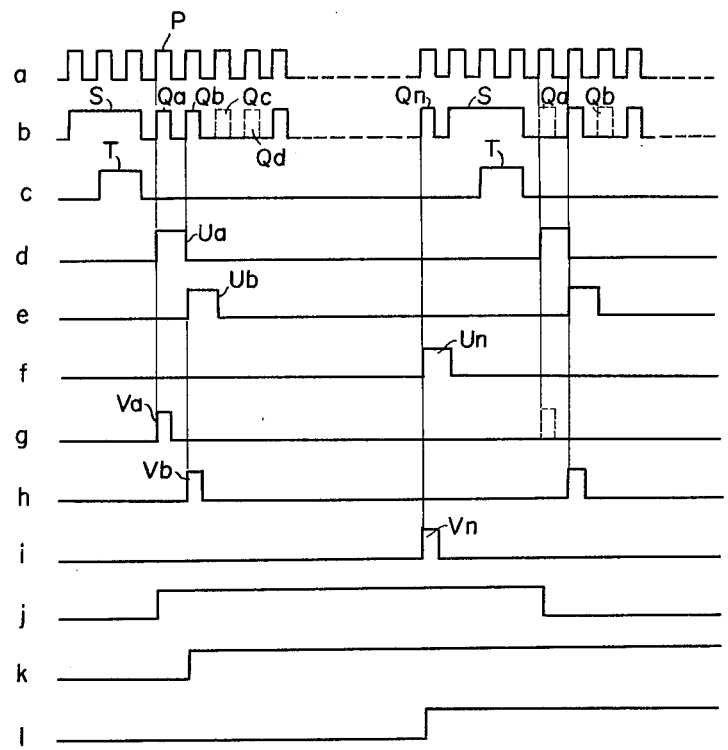
FIGS. 2 and 3 are respectively time charts for illustrating the apparatus of FIG. 1.
Figure 3:
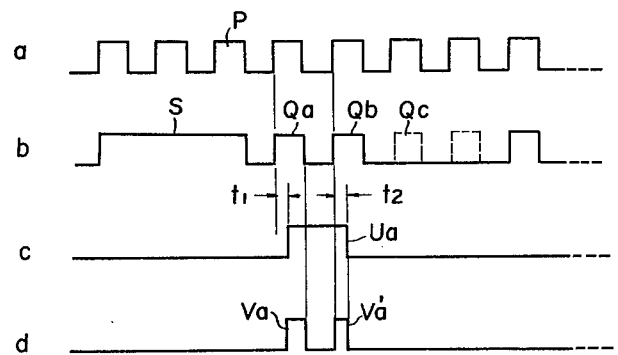
Figure 5:
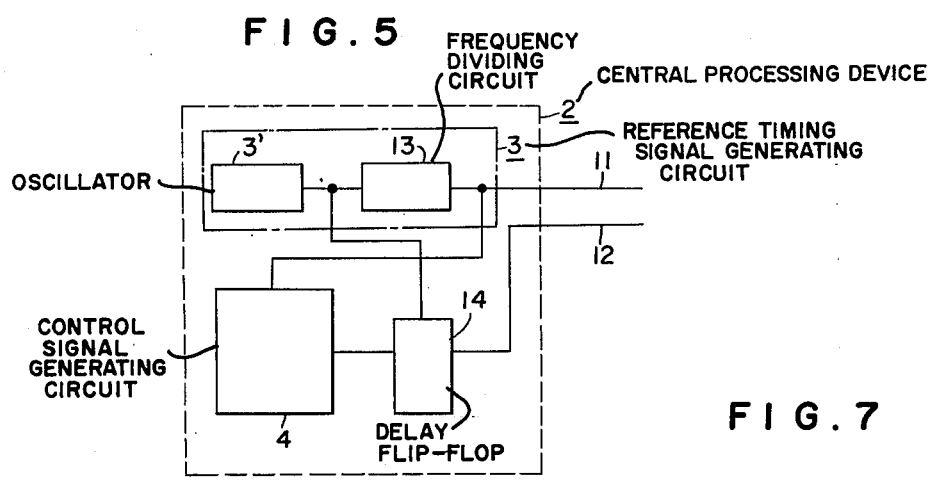
FIG. 5 is a block diagram showing one embodiment of the apparatus of the invention for generating the signals shown in the time chart of FIG. 4.

FIG. 5 is a block diagram of circuitry for generating the signals shown in the time chart of FIG. 4. Like references in FIGS. 1 and 5 designate identical or corresponding parts. The reference timing signal generating circuit 3 comprises an oscillator 3' for generating a signal having double the frequency of that of the reference timing signal shown in FIG. 4a and a frequency dividing circuit 13 for dividing the frequency of the signal of the oscillator and generating the reference timing signal shown in FIG. 4a. The control signal generating circuit 4 generates the control signal of FIG. 2b. The delay flip-flop 14 delays the control signal information for 1 bit of the output signal pulse of the reference timing signal generating circuit 3 whereby a control signal having a phase difference of $\pi/2$ from the reference timing signal is generated as shown in FIG. 4b.

Although the phase difference between the control signal and the reference timing signal is disclosed to be $\pi/2$, other phase differences could be utilized. Any desired phase difference between two signals can be easily provided by employing a delay circuit.

Figure 6:
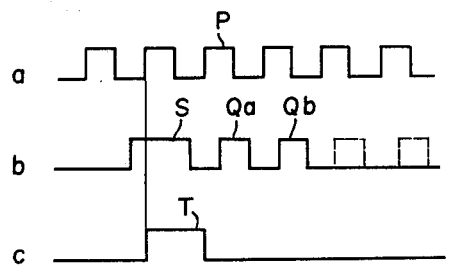
FIG. 6 is a time chart for other signals according to the invention.
Figure 7:
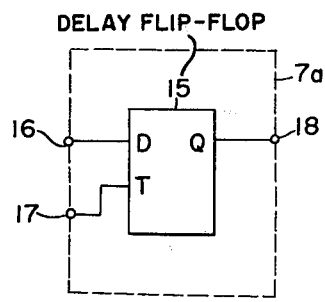
FIG. 7 is a synchronizing signal separating circuit of the invention which is operated by the signals of FIG. 6.

Using the signals of FIG. 4, it is possible to simplify the synchronizing signal separating circuits 7a – 7n by changing the form of the synchronizing signal S. FIG. 6 shows signals according to the invention wherein the synchronizing signal separating circuits 7a – 7n are simplified. FIG. 7 shows the circuit for separating the synchronizing signal S of FIG. 6 which comprises a delay flip-flop 15; input terminals 16, 17 and an output terminal 18. In FIG. 6, the control signal has a phase difference of $\pi/2$ with respect to the reference timing signal. Therefore, the control signal pulses Qa – Qn are not generated during the rising period of the reference timing signal pulse P. However, the synchronizing signal S is generated during the rising period of the reference timing signal pulse P whereby it can be detected as a synchronizing signal when the control signal is generated during the rising period of the reference timing signal pulse P.

With reference to delay flip-flop 15 of FIG. 7, when terminal 16 is connected to the control signal transmission line 12 and the terminal 17 is connected to the reference timing signal transmission line 11, the signal pulse T separated from the synchronizing signal S of FIG. 6c is generated through the terminal 18. The delay flip-flop 15 changes its output when the reference timing signal pulse P rises during the period in which the synchronizing signal S is generated and it again changes its output when the next reference timing signal pulse P rises after the synchronizing signal S is no longer present.

The synchronizing signal S is not limited to the form shown in FIG. 6 wherein the reference timing signal rises but once during the generation of synchronizing signal S. Even though the reference timing signal rises twice during the synchronizing signal pulse period shown in FIG. 4, it is possible to generate the signal pulse T apart from the synchronizing signal S even though the operation period of the delay flip-flop 15 is long. Even when the control signal pulses Qa – Qn are generated corresponding to only the rising of the reference timing pulses P and the synchronizing signals are generated corresponding to only the falling of the reference timing pulses P, and the flip-flop 15 is operated by the falling of the reference timing pulses, the synchronizing signal S can be easily detected. Further, in accordance with the apparatus of the invention, the control signal can be generated by either the rising or the falling of the reference timing signal and the synchronizing signal can be generated by the rising or the falling of the reference timing signal in a manner opposite to the generation of the control signal.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A time division multiple transmission control apparatus comprising:
   a central processing device comprising a reference timing signal generating circuit to generate reference timing signal pulses and a control signal generating circuit to generate control signal pulses,
   the reference timing pulse signal and the control pulse signal being of the same frequency,
   a plurality of electrical devices to be selectively driven,
   a terminal processing device for each electrical device,
   each terminal processing device comprising:
   an address detecting circuit comprising a sychronizing signal division circuit and a timing circuit for generating an address signal pulse,
   a signal separating circuit for generating a driving signal pulse,
   a driving circuit,
   means connecting the synchronizing signal division circuit to the timing circuit,
   means connecting the timing circuit to the signal separating circuit,
   means connecting the signal separating circuit to the driving circuit,
   means connecting the driving circuit to the electrical device,
   means connecting the reference timing signal generating circuit to the control signal generating circuit,
   a reference timing signal transmission line connected between the reference timing signal generating circuit and each of the synchronizing signal division circuits as well as each of the timing circuits,
   a control signal transmission line connected between the control signal generating circuit and each of the synchronizing signal division circuits as well as each of the signal separating circuits,
   means for delaying the control signal pulses with respect to the reference timing signal pulse to generate a phase difference therebetween so that an address signal pulse with a rising and/or falling delay time appearing at the output of a timing circuit in one of the terminal processing devices will not overlap a subsequent control signal pulse causing generation of an undesirable driving signal pulse at the output of the signal separating circuit in the terminal processing device.

2. A time division multiple transmission control apparatus in accordance with claim 1 wherein the central processing device comprises
   a reference timing signal generating circuit comprising an oscillator and a frequency dividing circuit,
   a control signal generating circuit,
   a delay flip-flop,
   means connecting the output of the oscillator to the input of the frequency dividing circuit and to an input of the delay flip-flop,
   means connecting a first output of the control signal generating circuit to the delay flip-flip and an input of the control signal generating circuit to the reference timing signal transmission line,
   means connecting the output of the frequency dividing circuit to the reference timing signal transmission line,
   means connecting the output of the delay flip-flop to the control signal transmission line.

3. A time division multiple transmission control apparatus in accordance with claim 2 wherein the synchronizing signal division circuit comprises a delay flip-flop.

4. A time division multiple transmission control apparatus in accordance with claim 1 wherein the phase difference is $\pi/2$ radians.

5. A time division multiple transmission control apparatus in accordance with claim 1 wherein the control signal pulses comprise a synchronizing signal pulse for determining the repeat period of the control signal pulses, the control signal pulses being generated corresponding to either the rising or falling of the reference timing signal pulses, and the synchronizing signal pulse being generated corresponding to the rising or falling of the reference timing signal pulses in a manner opposite to the generation of the control signal pulses.

* * * * *